Aug. 30, 1938.  H. RUBENSTEIN  2,128,326
ANIMAL TAIL WAGGING DEVICE
Filed Oct. 12, 1936
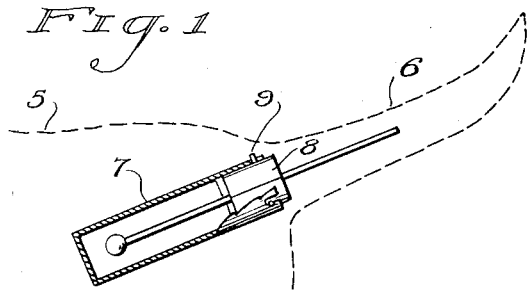
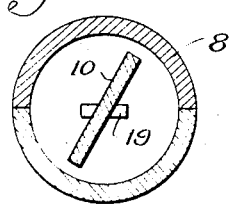
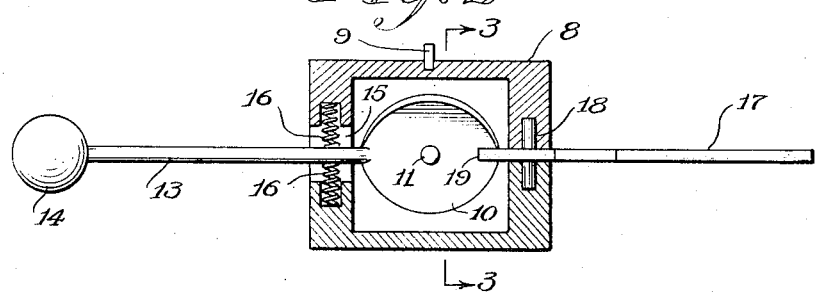
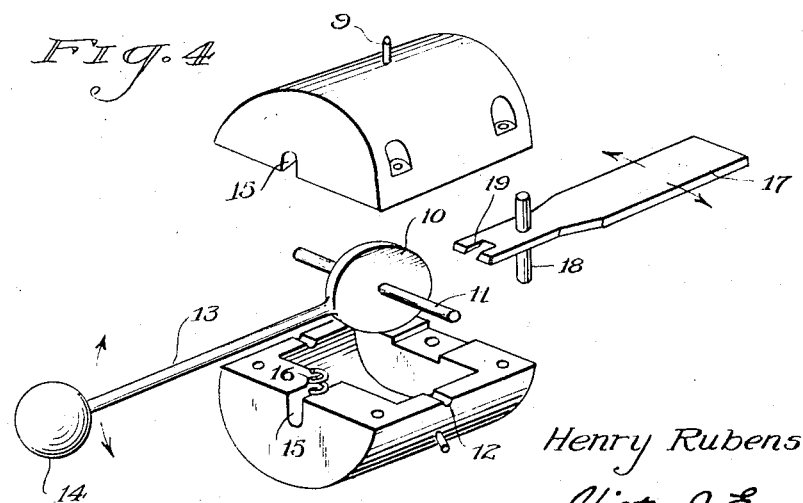
Henry Rubenstein
INVENTOR
BY Victor J. Evans & Co.
ATTORNEYS Patented Aug. 30, 1938

2,128,326

UNITED STATES PATENT OFFICE 2,128,326

ANIMAL TAIL WAGGING DEVICE

Henry Rubenstein, Brooklyn, N. Y.

Application October 12, 1936, Serial No. 105,329

7 Claims. (Cl. 46—123)

The present invention relates to toys, such as stuffed animals and the like, and more particularly to devices associated therewith by which the animal's tail is caused to wag.

The primary object of the invention is to provide a simple and rugged mechanism adapted for association with toy animals and similar articles, the same being so arranged as to actuate the animal's tail in a wagging fashion upon patting or slightly impacting the animal.

A further object of the invention resides in the provision of a device of the character indicated whereby the animal's tail returns to normal central position after the wagging motion has ceased.

Another object is to provide a novel and practical mounting for the device which is readily adaptable for construction within the body of a hollow or stuffed animal, at the same time affording simple means by which the tail portion of the animal may be conveniently assembled onto the body of the animal.

The invention will be fully and comprehensively understood from a consideration of the following detailed description when read in connection with the accompanying drawing which forms part of the application.

In the drawing:

Fig. 1 is a side elevational view of the device, portions thereof being broken away in central section, the device being installed in the animal shown in outline.

Fig. 2 is a central vertical section thru the actuating mechanism of the device.

Fig. 3 is a transverse sectional view taken on line 3—3 of Fig. 2; and

Fig. 4 is an exploded perspective view of the actuating mechanism as shown in Fig. 2.

Reference is now directed to the accompanying drawing for a more detailed description thereof and particularly to Fig. 1 in which the body portion 5 of the animal is shown in dotted outline including a tail portion 6. In the preferred arrangement of the device a suitable tubular casing 7 is constructed within the body portion 5 of the animal as by inserting the tube 7 within the stuffing thereof, preferably in a substantially horizontal position.

One end of the tube is closed, the opposite end being adapted to receive a housing 8 onto which the actuating mechanism of the device is assembled. The preferred manner of attaching the housing 8 into the open end of the casing 7 comprises a series of radial pins 9 each adapted to be engaged in a corresponding L slot cut in the peripheral wall of the casing 7. In assembling the tail portion 6 to the body 5 of the animal the tail portion is so constructed as to include the housing 8 at its adjoining end. In that the casing 7 is permanently affixed within the body portion 5 the tail portion 6 may be readily assembled thereon by inserting the housing 8 into the tube 7, the same being secured by engagement of the radial pins 9 with the corresponding L slots.

The housing 8 comprises complemental half members for convenience in assembling, each member being hollowed out to house a cam 10. The cam 10 is rotatably mounted on a shaft 11, the latter being journalled in suitable bearings 12 formed in the housing 8. From the cam 10 projects an arm 13, the latter having at its free end a suitable weight 14 presenting a pendulum. The arm 13 extends thru slotted portions 15 in the housing 8 at which point a pair of springs 16 are disposed to press against the arm 13 to urge same to its central horizontal portion, the springs 16 being retained in suitable apertures in the housing 8.

From the opposite end of the housing 8 projects a bar 17, the same being pivoted for horizontal swinging on the trunnions 18. The bar 17 extends into the housing 8 and has its inner end formed to function as a follower 19 to engage with the cam 10. The follower 19 is preferably formed by longitudinally slotting the inner end of the bar 17, the mentioned slot being disposed to engage the end walls of the cam 10 substantially as shown in Figs. 2 and 3.

It will be observed that the pendulum embodied in the arm 13 and the weight 14 is adapted to swing by the shaft 11 in a substantially vertical plane, as indicated by the arrows in Fig. 4. By reference to Fig. 3 it will be noted that the cam 10 is inclined in relation to the axis of rotation of the mentioned pendulum so that upon partial rotation of the cam 10 during a vertical swinging of the pendulum the follower 19 will be actuated in a horizontal plane thereby causing the bar 17 to swing horizontally.

As aforeindicated, the device may be actuated by a slight impact as would result from lightly patting the animal. This impact will obviously cause weight 14 to raise or lower against the power of the corresponding spring 16, which spring, after being amply compressed, will move the weight 14 in the opposite direction against the power of the other spring 16. In this manner the pendulum, including the weight 14, will be caused to oscillate in a substantially vertical plane until the momentum of the weight 14 is insufficient to compress the springs 16, whence the latter will hold the arm 13 in normal central position. In view of the action of the inclined cam 10 and the associated follower 19, it will be readily seen that the bar 17 connected with the tail 6 will cause the tail to be swung in a substantially horizontal plane in a manner simulating that of tail-wagging.

It is to be understood that this improvement is capable of extended application and is not confined to the exact showing of the drawing nor to the precise construction described and, therefore, such changes and modifications may be made therein as do not affect the spirit of the invention or exceed the scope thereof as expressed in the appended claims.

What is claimed as new is:

1. In a toy animal having a body and a tail, the combination of a weighted arm forming a pendulum and pivotally mounted within said body so as to swing in a substantially vertical plane therein, a member within said tail and swingably mounted on said body to swing in a horizontal plane and means operatively connecting said pendulum with said tail member and adapted to actuate the latter by movement of said pendulum.

2. In a toy animal having a body and a tail, the combination of a weighted arm forming a pendulum and pivotally mounted within said body so as to swing in a substantially vertical plane therein, a member within said tail and swingably mounted on said body to swing in a horizontal plane and means operatively connecting said pendulum with said tail member and adapted to actuate same by movement of said pendulum, said means comprising a cam and a follower for same carried respectively on the pendulum and tail member.

3. In a toy animal having a body and a tail, the combination of a weighted arm forming a pendulum and pivotally mounted within said body so as to swing in a substantially vertical plane therein, a member within said tail and swingably mounted on said body to swing in a horizontal plane and means operatively connecting said pendulum with said tail member and adapted to actuate same by movement of said pendulum, said means comprising a cam carried on said pendulum to be oscillated by swinging of the latter, and a follower on said tail member associated with said cam.

4. In a toy animal having a body and a tail, the combination of a weighted arm forming a pendulum and pivotally mounted within said body so as to swing in a substantially vertical plane therein, resilient means engaging said pendulum adjacent the pivotal end thereof whereby to yieldably hold same in normal position, a member within said tail and swingably mounted on said body to swing in a horizontal plane and means operatively connecting said pendulum with said tail member and adapted to actuate same by movement of said pendulum.

5. In a toy animal having a body and a tail, the combination of a weighted arm forming a pendulum and pivotally mounted within said body so as to swing in a substantially vertical plane therein, resilient means engaging said pendulum adjacent the pivotal end thereof whereby to yieldably hold same in normal position, a member within said tail and swingably mounted on said body to swing in a horizontal plane and means operatively connecting said pendulum with said tail member and adapted to actuate same by movement of said pendulum, said means comprising a cam carried on said pendulum to be oscillated by swinging of the latter, and a follower on said tail member associated with said cam.

6. An amusement device comprising a form shaped to resemble an animal, a portion of said form adapted to movement in a manner similar to the movement of the corresponding portion of the animal simulated, the means for producing said movement comprising a pendulum, a cam element actuated by movement of said pendulum, a cam rider element associated with the portion of the form to be moved and engaged in cooperative relationship with the cam aforesaid whereby movement of the pendulum in one plane is translated into movement of the portion of the form in a plane substantially perpendicular to the plane of movement of the pendulum.

7. An amusement device comprising a form shaped to resemble an animal, a portion of said form adapted to movement in a manner similar to the movement of the corrresponding portion of the animal simulated, the means for producing said movement comprising a pendulum freely supported on pivots and capable of limited movement, resilient means associated with said pendulum and supporting means whereby the pendulum is normally maintained in a position intermediate its limits of movement, a cam element actuated by movement of said pendulum, a cam rider element associated with the portion of the form to be moved and engaged in cooperative relationship with the cam aforesaid whereby movement of the pendulum in one plane is translated into movement of the portion of the form in a plane substantially perpendicular to the plane of movement of the pendulum.

HENRY RUBENSTEIN.